United States Patent
Adams et al.

(10) Patent No.: US 12,298,576 B2
(45) Date of Patent: May 13, 2025

(54) FOAM FOR OPTICAL FIBER CABLE, COMPOSITION, AND METHOD OF MANUFACTURING

(71) Applicant: CORNING RESEARCH & DEVELOPMENT CORPORATION, Corning, NY (US)

(72) Inventors: Ryan Thomas Adams, Charlotte, NC (US); Bradley Jerome Blazer, Granite Falls, NC (US); Anne Germaine Bringuier, Taylorsville, NC (US); Xiaole Cheng, Painted Post, NY (US); Sergey Vladimirovich Chernykh, Hickory, NC (US); John Richard Jacks, Wellington, OH (US); Rebecca Elizabeth Sistare, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/605,032

(22) Filed: Mar. 14, 2024

(65) Prior Publication Data

US 2024/0219666 A1     Jul. 4, 2024

Related U.S. Application Data

(63) Continuation of application No. 17/498,874, filed on Oct. 12, 2021, now Pat. No. 11,934,023, which is a
(Continued)

(51) Int. Cl.
G02B 6/44     (2006.01)
C08J 9/00     (2006.01)
(Continued)

(52) U.S. Cl.
CPC ............ *G02B 6/443* (2013.01); *C08J 9/0061* (2013.01); *C08L 23/06* (2013.01); *C08L 23/16* (2013.01);
(Continued)

(58) Field of Classification Search
CPC ...... G02B 6/44; G02B 6/443; C08J 2205/044; C08J 9/0061; C08J 23/06; C08J 23/16
See application file for complete search history.

(56) References Cited

U.S. PATENT DOCUMENTS 5,162,397 A   11/1992   Descamps et al.
5,615,293 A    3/1997   Sayegh
(Continued)

FOREIGN PATENT DOCUMENTS

AU   2006232206 A1   10/2006
CN      1253148 A     5/2000
(Continued)

OTHER PUBLICATIONS

Australian Patent Application No. 2020257284, First Examination Report dated Oct. 11, 2022, 5 pages, Australian Patent Office.
(Continued)

*Primary Examiner* — Tina M Wong
(74) *Attorney, Agent, or Firm* — Thomas R. Irwin

(57) ABSTRACT

Embodiments of the disclosure relate to an optical fiber cable having at least one optical fiber, a cable jacket, and a foam layer. The cable jacket has an inner surface and an outer surface. The outer surface is an outermost surface of the optical fiber cable, and the inner surface is disposed around the at least one optical fiber. The foam layer is disposed between the at least one optical fiber and the cable jacket. The foam layer includes a polymer component having from 30% to 100% by weight of a polyolefin elastomer (POE) or thermoplastic elastomer (TPE) and from 0% to
(Continued)

70% by weight of low density polyethylene (LDPE). The foam layer has a closed-cell morphology having pores with an average effective circle diameter of 10 μm to 500 μm. Further, the expansion ratio of the foam layer is at least 50%.

20 Claims, 5 Drawing Sheets

Related U.S. Application Data continuation of application No. PCT/US2020/028918, filed on Apr. 20, 2020.

(60) Provisional application No. 62/835,688, filed on Apr. 18, 2019.

(51) Int. Cl.
 *C08L 23/06* (2006.01)
 *C08L 23/16* (2006.01)

(52) U.S. Cl.
 CPC .... *C08J 2205/044* (2013.01); *C08J 2205/052* (2013.01); *C08J 2323/06* (2013.01); *C08J 2323/16* (2013.01); *C08J 2423/06* (2013.01); *C08J 2423/16* (2013.01); *C08L 2203/14* (2013.01); *C08L 2205/025* (2013.01); *C08L 2205/03* (2013.01); *C08L 2207/04* (2013.01); *C08L 2207/066* (2013.01)

(56) References Cited

U.S. PATENT DOCUMENTS

| | | | |
|---|---|---|---|
| 6,226,431 B1 | 5/2001 | Brown et al. | |
| 6,321,013 B1 | 11/2001 | Hardwick et al. | |
| 6,404,962 B1 | 6/2002 | Hardwick et al. | |
| 6,463,199 B1 | 10/2002 | Quinn et al. | |
| 6,748,146 B2 | 6/2004 | Parris | |
| 7,742,117 B2 | 6/2010 | Lee et al. | |
| 8,229,263 B2 | 7/2012 | Parris et al. | |
| 8,238,706 B2 | 8/2012 | Kachmar | |
| 8,620,124 B1 | 12/2013 | Blazer et al. | |
| 8,687,930 B2 | 4/2014 | Mcdowell et al. | |
| 10,031,302 B2 | 7/2018 | Ji et al. | |
| 11,327,260 B2 * | 5/2022 | Bringuier | G02B 6/4434 |
| 2003/0013778 A1 | 1/2003 | Sueda et al. | |
| 2003/0207952 A1 | 11/2003 | Sueda et al. | |
| 2003/0207953 A1 | 11/2003 | Sueda et al. | |
| 2004/0076386 A1 | 4/2004 | Nechitailo | |
| 2004/0240808 A1 | 12/2004 | Rhoney et al. | |
| 2004/0249009 A1 | 12/2004 | Homma et al. | |
| 2004/0252954 A1 | 12/2004 | Ginocchio et al. | |
| 2005/0213902 A1 | 9/2005 | Parsons | |
| 2006/0127016 A1 | 6/2006 | Baird et al. | |
| 2008/0020532 A1 | 1/2008 | Monfray et al. | |
| 2008/0183038 A1 * | 7/2008 | Tilson | A61B 1/018 600/104 |
| 2009/0190887 A1 | 7/2009 | Freeland et al. | |
| 2009/0317039 A1 | 12/2009 | Blazer et al. | |
| 2010/0232753 A1 | 9/2010 | Parris et al. | |
| 2011/0069932 A1 | 3/2011 | Overton et al. | |
| 2011/0091171 A1 | 4/2011 | Tatat et al. | |
| 2012/0251060 A1 | 10/2012 | Hurley | |
| 2013/0094821 A1 | 4/2013 | Logan | |
| 2014/0014391 A1 * | 1/2014 | Magner | H01B 7/18 174/102 R |
| 2015/0110451 A1 | 4/2015 | Blazer et al. | |
| 2015/0268430 A1 | 9/2015 | Bringuier et al. | |
| 2015/0309274 A1 | 10/2015 | Hurley et al. | |
| 2016/0215130 A1 * | 7/2016 | Esseghir | C08L 23/142 |
| 2016/0216468 A1 | 7/2016 | Gimblet et al. | |
| 2017/0276891 A1 | 9/2017 | Esseghir et al. | |
| 2017/0343752 A1 | 11/2017 | Ji et al. | |
| 2018/0180831 A1 | 6/2018 | Blazer et al. | |
| 2018/0252882 A1 | 9/2018 | Baucom et al. | |
| 2021/0302677 A1 * | 9/2021 | Boxer | G02B 6/4434 |

FOREIGN PATENT DOCUMENTS

| | | |
|---|---|---|
| CN | 1279407 A | 1/2001 |
| CN | 106461899 A | 2/2017 |
| CN | 107003491 A | 8/2017 |
| EP | 0782025 A1 | 7/1997 |
| EP | 1085357 A2 | 3/2001 |
| EP | 1243957 A2 | 9/2002 |
| WO | 2009/154990 A2 | 12/2009 |
| WO | 2016/073862 A2 | 5/2016 |
| WO | 2017/205190 A1 | 11/2017 |
| WO | 2018/102330 A1 | 6/2018 |
| WO | 2020/215052 A1 | 10/2020 |

OTHER PUBLICATIONS

European Patent Application No. 20791315.3, Extended European search report dated Nov. 29, 2022; 11 pages; European Patent Office.

International Search Report and Written Opinion of the International Searching Authority; PCT/US2020/028918 Mailed on Jun. 26, 2020, 7 pages; European Patent Office.

Chinese Patent Application No. 202080044716.5, Office Action dated Jun. 28, 2024, 4 pages (English Translation only), Chinese Patent Office.

* cited by examiner

FOAM FOR OPTICAL FIBER CABLE, COMPOSITION, AND METHOD OF MANUFACTURING

CROSS-REFERENCED TO RELATED APPLICATIONS

This application is a continuation of U.S. application Ser. No. 17/498,874, filed Oct. 12, 2021, which is a continuation of International Patent Application No. PCT/US2020/028918 filed Apr. 20, 2020, which claims the benefit of priority under 35 U.S.C. § 119 of U.S. Provisional Application Ser. No. 62/835,688 filed on Apr. 18, 2019, the content of which is relied upon and incorporated herein by reference in its entirety.

BACKGROUND

The present invention is related to an optical fiber cable having a foam layer disposed between a ribbon stack and a cable jacket and, in particular, to polymer blend and method of forming the foam layer. Optical fiber cables incorporate a variety of materials with function-specific properties in multiple layers to achieve desired performance. For examples, the cable jacket and buffer tubes are often made of polyolefin materials. The optical fiber cable may also include a metal armor layer and one or more glass-reinforced plastic strength members. Though the polyolefins often provide good flexibility, the armor layer and/or strength members may create signal attenuation when the cable is bent, coiled, crushed, or twisted.

SUMMARY

In one aspect, embodiments of the present disclosure relate to an optical fiber cable having at least one optical fiber, a cable jacket, and a foam layer. The cable jacket has an inner surface and an outer surface. The outer surface is an outermost surface of the optical fiber cable, and the inner surface is disposed around the at least one optical fiber. The foam layer is disposed between the at least one optical fiber and the cable jacket. The foam layer includes a polymer component having from 30% to 100% by weight of a polyolefin elastomer (POE) or thermoplastic elastomer (TPE) and from 0% to 70% by weight of low density polyethylene (LDPE). The foam layer has a closed-cell morphology having pores with an average effective circle diameter of 10 µm to 500 µm. Further, the expansion ratio of the foam layer is at least 50%.

In another aspect, embodiments of the present disclosure relate to a method of preparing an optical fiber cable. In the method, a polymer blend is prepared that includes from 30% by weight to 100% by weight of a polyolefin elastomer (POE) or thermoplastic elastomer (TPE) and from 0% by weight to 70% by weight of low density polyethylene. The POE or TPE has an unfoamed tensile modulus of at most 10 MPa at 100% secant. The polymer blend is extruded around an optical fiber cable core in a manner that produces a foam layer surrounding the cable core along a longitudinal axis of the cable core.

In yet another aspect, embodiments of the present disclosure relate to a foam having from 30% to 100% by weight of a polyolefin elastomer (POE) or thermoplastic elastomer (TPE) and from 0% to 70% by weight of low density polyethylene (LDPE). The POE or TPE has an unfoamed tensile modulus of at most 10 MPa at 100% secant. The foam has a closed-cell morphology having pores with an average effective circle diameter of from 10 µm to 500 µm. The expansion ratio of the foam is at least 50%, and the foam has a compression set of no more than 30% as measured after compression to a strain of 50% for ten hours and after four hours of recovery time.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, embodiments of the present disclosure relate to a thermoplastic foam that can be extruded around one or more ribbon stacks and/or buffer tubes of an optical fiber cable. The foam is formed from either a polymer blend of polyolefin elastomer (POE) and low density polyethylene (LDPE) or a thermoplastic elastomer (TPE) with or without LDPE. The foam provides cushion for the optical fibers within the buffer tube(s). That is, the foam helps prevent attenuation of the optical fibers when the cable is bent, crushed, twisted, flexed, etc. In particular, the foam, which has a low modulus, diminishes the transmission of outside stress forces to the ribbon stack, which could otherwise cause fiber attenuation.

Further, in armored cable designs, the foam prevents attenuation issues caused by armor contact during cable bending, flexing, or coiling. Additionally, the foam allows for the reduction of the wall thickness of the buffer tubes and of the cable jacket so as to allow for increased fiber density within a given cable outside diameter. In this way, the foam also allows for significantly improved cable designs along with cost reduction through elimination of free space in the tubes, reduction of cable outer diameter, and use of smaller strength members (such as glass-reinforced fiber rods). As will be discussed more fully below, the polymer blend or TPE is extruded around a central buffer tube or stranded buffer tubes in a manner that causes it to foam. These and other advantages and aspects of the foam will be discussed in relation to the embodiments disclosed and depicted herein, especially as they relate to an optical fiber cable. However, these embodiments are exemplary in nature, not limiting.

Figure 1:
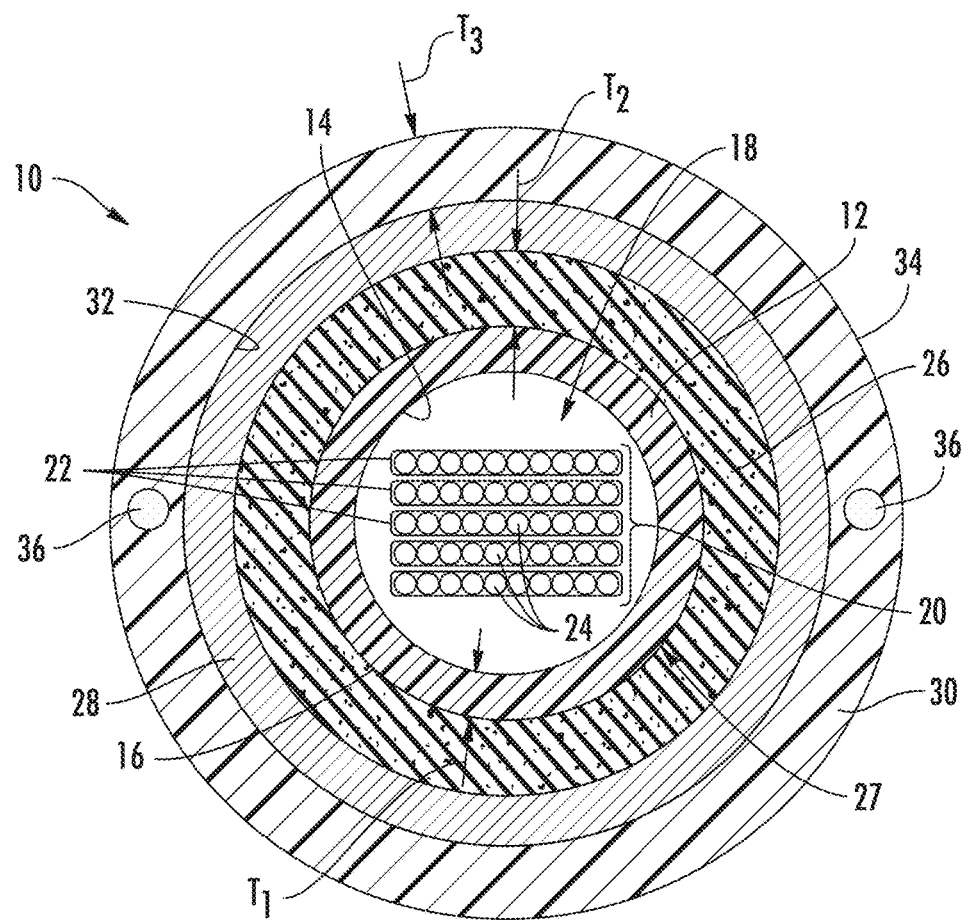
FIG. 1 is longitudinal, cross-sectional view of an optical fiber cable having a foam layer, according to an exemplary embodiment.

FIG. 1 depicts a longitudinal, cross-sectional view of an optical fiber cable 10. The optical fiber cable 10 includes at least one buffer tube 12, shown as a central tube. The buffer tube 12 has an inner surface 14 and an outer surface 16 that define an average buffer tube thickness $T_1$. In embodiments, the thickness $T_1$ of the buffer tube 12 is from 0.25 mm to 0.30 mm. The inner surface 14 defines a central bore 18 that extends along the longitudinal axis of the optical fiber cable 10 for at a portion of the length of the optical fiber cable 10. Disposed within the central bore 18 of the buffer tube 12 is a stack 20 of optical fiber ribbons 22. The optical fiber ribbons 22 include a plurality of optical fibers 24 arranged in a substantially planar array. In embodiments, the optical fibers 24 may be held in the array via a binding matrix and at least one coating of a curable resin.

Surrounding the buffer tube 12 along the longitudinal axis is a foam layer 26. As used herein, each element inside the foam layer 26 will be collectively referred to as an "optical fiber cable core" 27. Thus, in the embodiment of FIG. 1, the optical fiber cable core 27 includes the stack 20 of optical fiber ribbons 22 and the buffer tube 12. In embodiments, the foam layer 26 is extruded and drawn over the outer surface 16 of the buffer tube 12. Further, in embodiments, the foam layer 26 has a thickness $T_2$ of from 0.5 mm to 3 mm. In other embodiments, the foam layer 26 has an average thickness $T_2$ of from 0.5 mm to 2 mm, and in still other embodiments, the foam layer 26 has a thickness $T_2$ of from 1 mm to 2 mm.

Optionally, in embodiments, the optical fiber cable 10 includes an armor layer 28 disposed around the foam layer 26. The armor layer 28 may be formed from a metal tape that is wrapped around the cable core 27, or may be comprised of a dielectric material or any other suitable material for protecting the core elements of the optical fiber cable 10. In certain embodiments, the armor layer 28 is corrugated. A cable jacket 30 surrounds the armor layer 28 (if provided) or the foam layer 26 (if no armor layer 28 is provided). The cable jacket 30 has an inner surface 32 and an outer surface 34 that define an average jacket thickness $T_3$. In embodiments, the cable jacket 30 has a thickness $T_3$ of from 1.25 mm to 1.75 mm. In embodiments, the cable jacket 30 has a thickness $T_3$ of about 1.50 mm. In embodiments, the outer surface 34 of the cable jacket 30 defines the outermost surface of the optical fiber cable 10. As depicted in FIG. 1, the optical fiber cable 10 may include strength elements 36 embedded in the cable jacket 30 between the inner surface 32 and the outer surface 34. Exemplary strength elements 36 include glass-reinforced plastic (GRP) rods and metal wire. In embodiments, the thickness $T_3$ is limited on the low end of the thickness $T_3$ range by the size of the strength elements 36.

Figure 2:
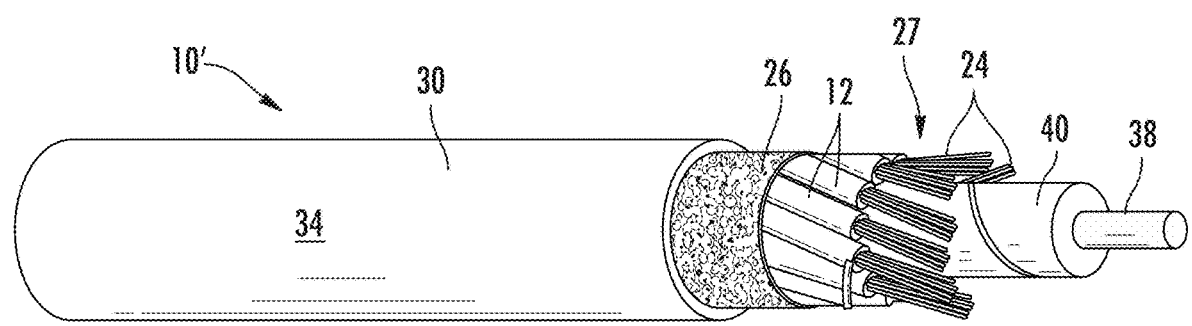
FIG. 2 is a perspective view of a portion of an optical fiber cable having a foam layer, according to an exemplary embodiment.

In another embodiment shown in FIG. 2, the optical fiber cable 10' includes a plurality of buffer tubes 12 stranded around a central strength member 38 having an upjacket 40. The buffer tubes 12 contain a plurality of optical fibers 24 in a loose tube configuration. The buffer tubes 12 are stranded around the upjacketed central strength member 38, e.g., in a helical or SZ-stranded manner. Thus, in this embodiment of the optical fiber cable 10', the cable core 27 includes the plurality of buffer tubes 12, the optical fibers 24, the central strength member 38, and the upjacket 40. Surrounding the cable core 27 is the foam layer 26, and disposed around the foam layer 26 is the cable jacket 30.

Figure 8:
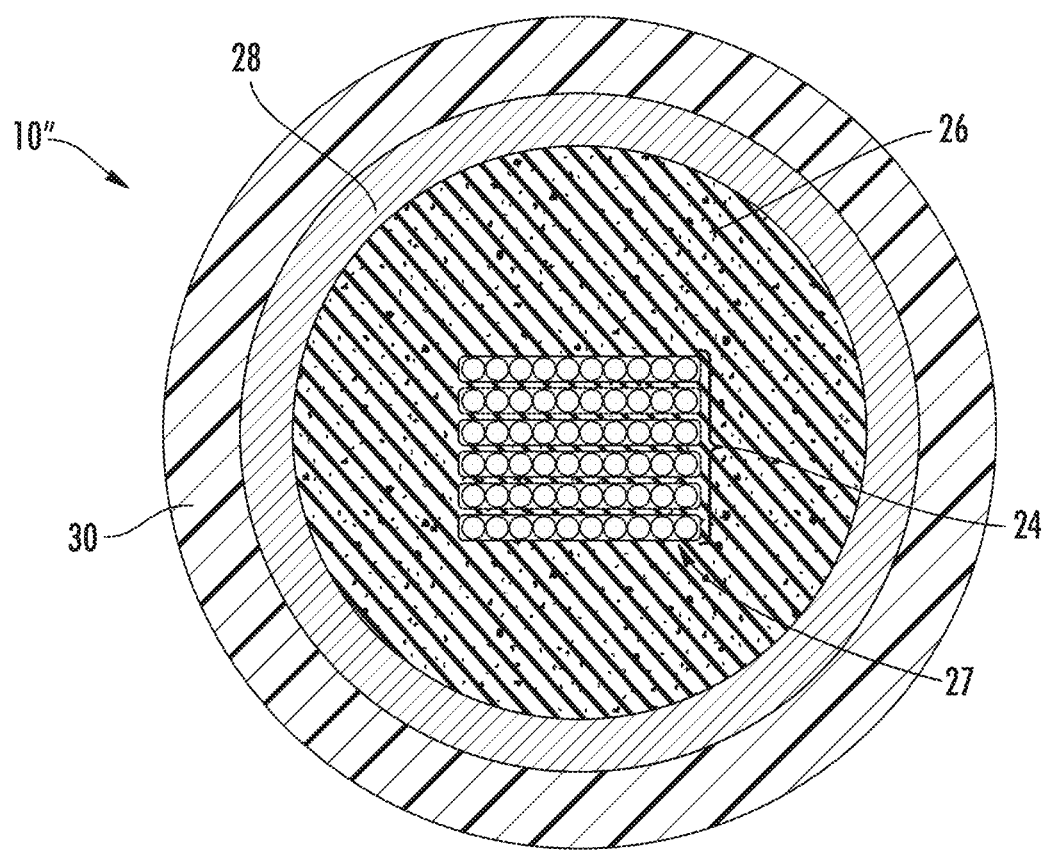
FIG. 8 is longitudinal, cross-sectional view of a portion of an optical fiber cable having a foam layer, according to an exemplary embodiment.

In a further embodiment of an optical fiber cable 10" depicted in FIG. 8, the foam layer 26 surrounds the ribbon stack 24. In the embodiment depicted, the buffer tube 12 is excluded (in which case the cable core 27 of the embodiment depicted includes just the ribbon stack 24). However, in other embodiments, a buffer tube 12 may surround the foam layer 26, and another foam layer 26 could surround the buffer tube 12 (in which case the cable core 27 includes the ribbons tack 24, the first foam layer 26, and the buffer tube 12). In the embodiment depicted, the foam layer 26 is surrounded by an optional armor layer 28, which is surrounded by the cable jacket 30. Thus, in the embodiment of FIG. 8, the foam layer 26 is in contact with the outer surface of the ribbon stack 24 and with the inner surface of the armor layer 28. However, in other embodiments, the foam layer 26 can be in contact with the outer surface of the ribbon stack 24 and with the inner surface 14 of a buffer tube 12 or with the inner surface 32 of the cable jacket 30.

Having described three embodiments of the optical fiber cables 10, 10', 10" in which the foam layer 26 may be incorporated, the foam layer 26 will now be described in greater detail. As mentioned above, the foam layer 26 comprises either (1) a blend of polyolefin elastomer (POE) and LDPE or (2) a thermoplastic elastomer (TPE) alone or in a blend with LDPE.

In embodiments, the polymer blend of POE or TPE and LDPE comprises from 20% by weight to 70% by weight of LDPE. In other embodiments, the polymer blend comprises from 20% by weight to 40% by weight of LDPE, and in still other embodiments, the polymer blend comprises from 20% by weight to 30% by weight of LDPE. In embodiments, the polymer blend comprises from 30% by weight to 80% by weight of POE or TPE. In other embodiments, the polymer blend comprises from 60% by weight to 80% by weight of POE or TPE, and in still other embodiments, the polymer blend comprises from 70% by weight to 80% by weight of POE or TPE.

A variety of POE are suitable for use in the polymer blend that forms the foam layer 26. In an exemplary embodiment, the POE is selected to have an unfoamed tensile modulus of at most 10 MPa at 100% secant according to ASTM D638. In other embodiments, the POE is selected to have an unfoamed tensile modulus of at most 5 MPa at 100% secant according to ASTM D638. In exemplary embodiments, the POE is a copolymer of ethylene and a $C_3$-$C_{10}$ alpha-olefin, such as an ethylene-octene copolymer. Such copolymers offer a low modulus at low temperature and high recovery from mechanical deformations. Two commercially available ethylene-octene copolymers include the Engage™ copolymer family and Infuse™ Olefin Block Copolymers (OBCs). The Engage™ copolymers are random copolymers with melt temperatures up to 96° C., and the Infuse™ OBC have alternating blocks of hard (highly rigid) and soft (highly elastomeric) segments and melt temperatures ranging from 118° C. to 122° C. Exemplary commercial embodiments of LDPE include Agility™ 1021 or AXELERON™ 1258 (both available from Dow Chemical Company, Midland, MI).

In embodiments in which the foam layer 26 is made from TPE or a blend of TPE and LDPE, the TPE is selected to have an unfoamed tensile modulus of at most 10 MPa at 100% secant according to ASTM D638. In other embodiments, the thermoplastic elastomer is selected to have an unfoamed tensile modulus of at most 5 MPa at 100% secant according ASTM D638. Examples of thermoplastic elastomers suitable for use in forming the foam layer include thermoplastic polyolefins (TPO) and thermoplastic vulcanizates (TPV). Commercially available examples include Cat-alloy TPOs of Softell grades (LyondellBasell Industries, Houston, TX), Santoprene™ (Exxon Mobil Corporation, Irving, TX), and Sarlink® 8145 (Teknor Apex, Pawtucket, RI).

In embodiments, the foam layer 26 is formed by extruding the polymer blend at a sufficiently high pressure so that a gaseous blowing agent, or agents, remain dissolved in the melt until the polymer-gas saturation pressure is reached near or just beyond the exit of the extrusion die. At this saturation pressure, dissolved gas demixes as many, well-distributed bubble nuclei expand and serve as nucleation sites for additional bubble formation and growth.

In the polymer blend, POE or TPE provides the elastomeric property to the foam while the LDPE provides a high expansion ratio as a result of high melt strength that results from long chain branching. POE copolymers are based on a polyethylene or polypropylene backbone with high flexibility, i.e., low modulus. During foam extrusion, if the melt strength of the blend is too low, the bubbles will rupture and coalesce before the foam is cooled and a poor quality foam with large bubbles will result. The LDPE with its long chain branching exhibits strain hardening. Strain hardening is measured in the melt and represents the increase in elongational viscosity while the melt is being strained. This allows for maximum bubble expansion without excessive rupturing and coalescing.

In the optical fiber cables 10, 10', 10", the recovery from impact, crush, or bending stresses is achieved with a closed cell foam. In embodiments, the foam is manufactured in a physical foam process. However, in embodiments, the physical foam process can also incorporate one or more chemical foaming agents to further improve foam structure. Physical nucleating agents include talc, calcium carbonate, PTFE particles, and other high surface area inorganic and polymeric materials. In embodiments, such physical nucleating agents are present in the polymer blend in an amount of 0.1 to 1.0 wt %. Chemical foam agents include endothermic foaming agents, such as Reedy Safoam FPE-50 (available from Reedy Chemical Foam & Specialty Additives, Charlotte, NC) and exothermic foaming agents, such as azodicarbonamide and 4,4'-oxybis(benzenesulfonyl hydrazide (commercially available as XO-107 and XO-429 from Bergen International, LLC, East Rutherford, NJ). Additionally, in embodiments, the process of physical foaming with carbon dioxide, nitrogen, or other gases (such as small chain hydrocarbons) is further enhanced with the addition of chemical foaming agent and/or physical nucleators. Additionally, the blend may include one or more additives that prevent bubbles from coalescing, improve stability, and reduce gas diffusion out of the bubble; such as glycerol monostearate (GMS).

In embodiments, the foaming process is configured to achieve a fine, narrowly distributed closed cell morphology with equivalent circle diameter (ECD) of 10 μm to 500 μm. In other embodiments, the ECD is in the range of 20 μm to 400 μm, and in still other embodiments, the ECD is in the range of 30 μm to 300 μm. In embodiments, the resulting foam has an expansion ratio of at least 50%. In other embodiments, the resulting foam has an expansion ratio of at least 60%. Further, in embodiments, the resulting foam has a density reduction (as compared to an unfoamed blend) of 50%-70%, more particularly of 50%-60%.

Figure 3:
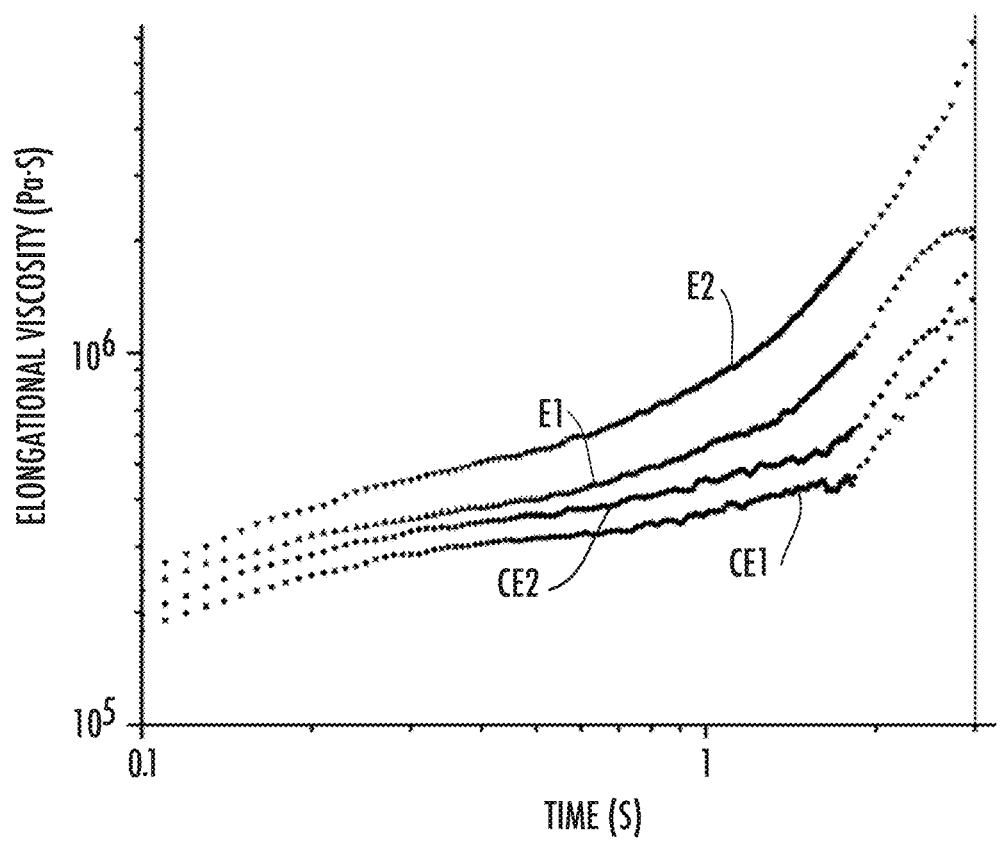
FIG. 3 is a graphical representation of the elongational viscosity as a function of time for polymer blends having various ratios of polyolefin elastomer to LDPE.

As mentioned, the strain hardening behavior of the polymer melt influences the properties of the foam produced. In FIG. 3, the extensional viscosity vs. time at a contestant strain of 1 sec$^{-1}$ for example polymer blend compositions is provided. The polymer compositions contain, in weight percent, 100% POE ("CE1"), 10%/90% LDPE/POE ("CE2"), 30%/70% LDPE/POE ("E1"), and 50%/50% LDPE/POE ("E2"). The LDPE used in each of the examples was Agility™ 1021, and the POE used in each example was Infuse™ 9807 (both available from Dow Chemical Company, Midland, MI). As can be seen from FIG. 3, E1 and E2 demonstrate more strain hardening behavior (defined as extensional viscosity increases that deviate from the linear viscoelastic region) than CE1 and CE2. As compared to CE1 and CE2 where the POE is at or above 90%, E1 and E2, which contain higher amounts of LDPE, demonstrate better straining hardening behavior for foaming while still retaining the elastomeric properties and low modulus of the POE.

Figure 5:
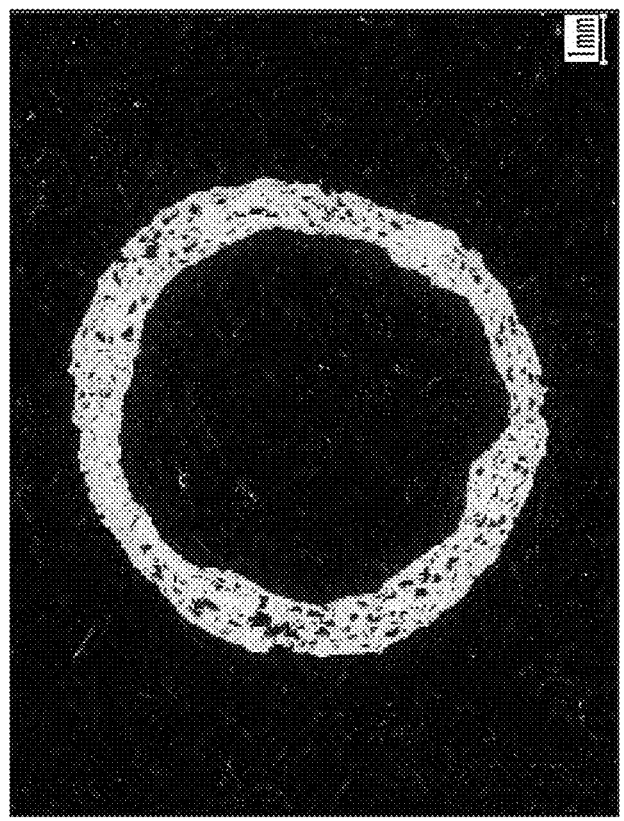
FIGS. 4 and 5 are photographs of cross-sections of foam layers of optical fiber cables having different porosities and pore size distributions.
Figure 4:
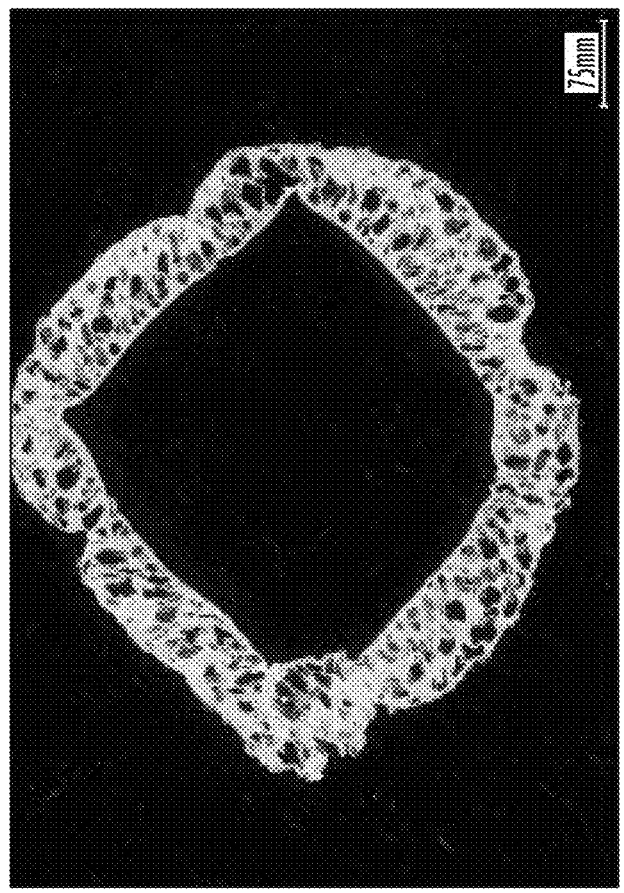

FIGS. 4 and 5 depict photomicrographs of foams having similar compositions (about 30/70 LDPE/POE by wt %, i.e., composition E1) made using different foaming agents. The foam E1a of FIG. 4 was created using a physical nucleator, and the foam E1b of FIG. 5 was created using a blowing agent. As can be seen in a comparison of the two foams, the foam E1a of FIG. 4 exhibits a greater density reduction of 72.23% as compared to the foam E1b of FIG. 5, which exhibits a density reduction of 60.51%. The pores of the foam E1a of FIG. 4 are also larger. The average area of each pore in FIG. 4 is 0.077 mm$^2$, whereas the average pore size in FIG. 5 is 0.009 mm$^2$. Another way to describe the pore size is equivalent circle diameter (ECD). The average ECD of the foam E1a of FIG. 4 is 0.256 mm, and the average ECD of the foam E1b of FIG. 5 is 0.087 mm. The pore size distribution of the foam E1b of FIG. 5 was much narrower than the pore size distribution of the foam E1a of FIG. 4. That is, the foam E1b of FIG. 5 had more pores of roughly the same size than did the foam E1a of FIG. 4.

The foams E1a, E1b of FIGS. 4 and 5 were also subjected to compression set testing. Compression set measurement was assessed via a parallel plate compression fixture on a dynamic mechanical analyzer (DMA Q800, available from TA Instruments, New Castle, DE). During testing, each foam specimen was compressed at a constant strain of 50%, 40%, or 30% for 10 hours. The compression load was removed from the foam specimens, and the specimens were monitored for strain relaxation over the next 4 hours. The results of the compression test are shown, below, in Table 1. As can be seen in Table 1, E1b had better compression set performance than E1a. That is, E1b recovered to closer to its original dimensions after compression than did E1a. The compression testing indicates that the pore morphology depicted in FIG. 5 provides better compression set performance for this particular application than the pore morphology depicted in FIG. 4.

TABLE 1

Compression Set Data for E1a and E1b

| Compression | Compression set (4 hours recovery time), % | |
|---|---|---|
| | E1a | E1b |
| 10 hours at 50% | 40.9 | 29.4 |
| 10 hours at 40% | 30.8 | 26.0 |
| 10 hours at 30% | 27.8 | 21.1 |

Figure 6:
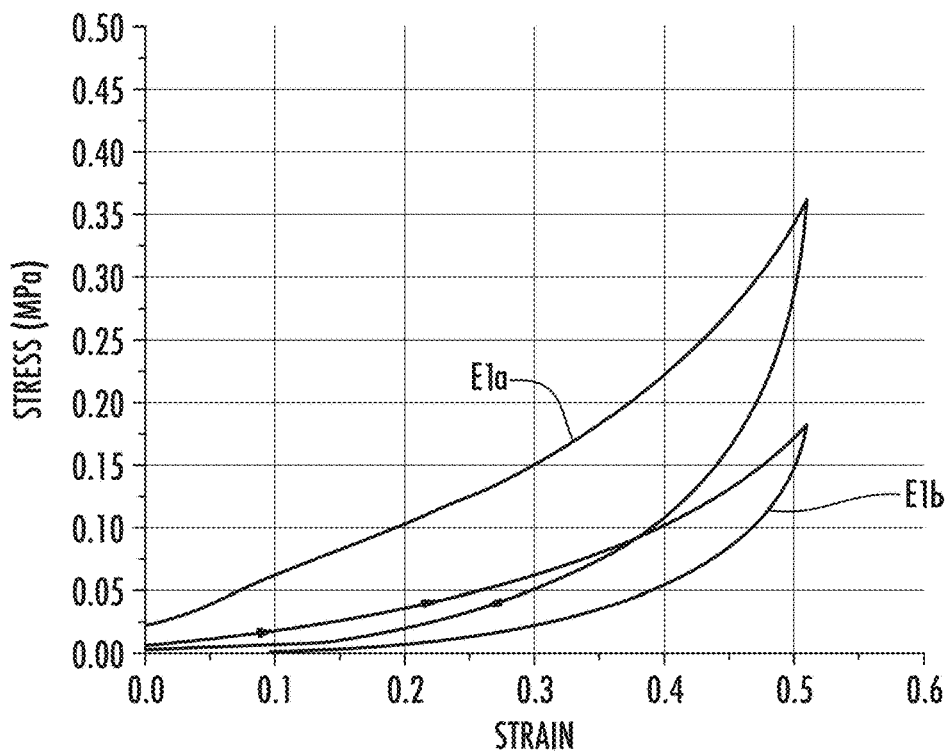
FIG. 6 is a hysteresis graph of compressive stress and strain on a foamed polymer blend according to an embodiment of the present invention and one foamed polymer blend according to a comparative example.
Figure 7:
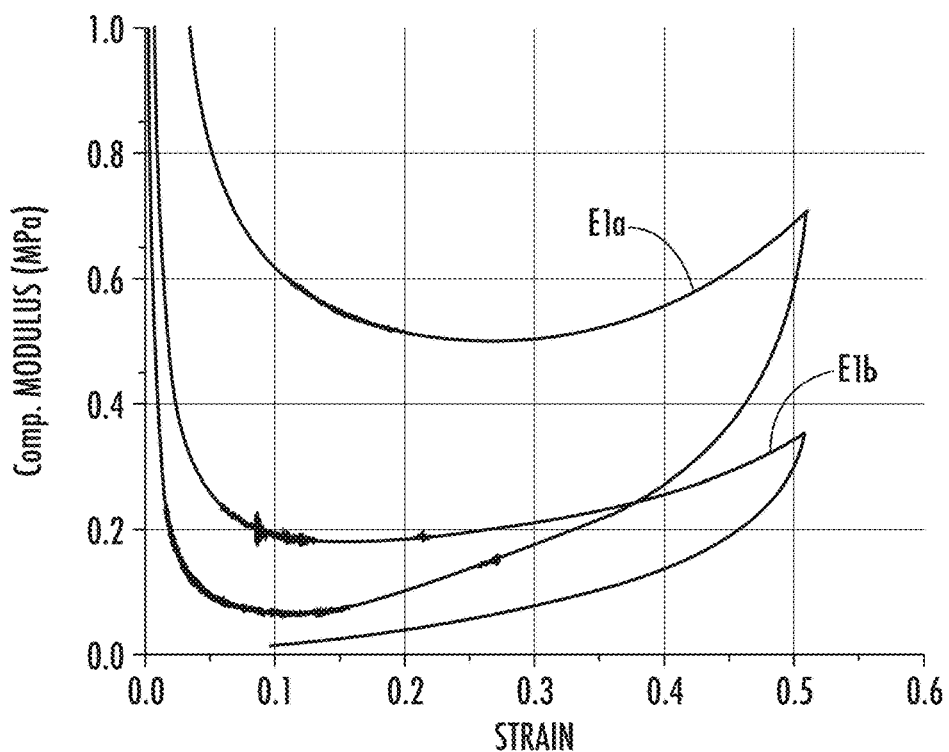
FIG. 7 is a graph of the compressive modulus as a function of strain for a foamed polymer blend according to an embodiment of the present invention and one foamed polymer blend according to a comparative example.

The foam specimens were also tested to determine other compression properties using a parallel plate compression fixture on an electromechanical tensile test machine (MTS Insight 5 kN) according to ASTM 3574—Standard Test Methods for Flexible Cellular Materials with the exception of part for test samples (specimens) preparation. Specimens size were significantly smaller than required by standard procedure. In particular, samples of E1a and E1b were loaded at a constant strain rate of 30% per min until 50% strain was reached. Thereafter, the samples were unloaded at a constant rate of 30% per minute until the parallel plates returned to their original position. FIGS. 6 and 7 show the stress-strain curve and the modulus-strain curves, respectively, for E1a and E1b. As can be seen in FIG. 6, E1b is more stiff than E1a, requiring more compressive stress to reach a strain of 50%. Additionally, E1b exhibited better recovery than E1a as the strain returned to 0 for E1b when the sample was unloaded. From FIG. 7, it can be seen that E1b has a higher compression modulus than E1a (0.7 MPa vs. 0.35 MPa).

The foams E1a, E1b were incorporated into optical fiber cable samples with the foam extruded over a subunit. Dimensional stability of the samples was measured according to ASTM D4565-15—Standard Test Methods for Physical and Environmental Performance Properties of Insulations and Jackets for Telecommunications Wire and Cable. The samples were tested along the direction of foam extrusion. The samples exhibited good dimensional stability over the temperature range of −40° C. to 85° C. In particular, as shown in Tables 2 and 3, below, it can be seen that the samples each had a length change of less than 5% after being held at 85° C. for 4 hours and after being held at 110° C. for 24 hours.

TABLE 2

Foam E1b over Subunit

| Specimen | % Change after 4 hrs. at 85° C. | % Change after 24 hrs. at 110° C. |
|---|---|---|
| 1 | −2.4 | −3.1 |
| 2 | −2.8 | −3.1 |
| 3 | −2.1 | −2.4 |
| Mean | −2.4 | −2.9 |

TABLE 3

Foam E1a over Subunit

| Specimen | % Change after 4 hrs. at 85° C. | % Change after 24 hrs. at 110° C. |
|---|---|---|
| 1 | −3.3 | −3.9 |
| 2 | −2.5 | −2.9 |
| 3 | −1.9 | −2.3 |
| Mean | −2.6 | −3.0 |

Foams having different compression modulus can be utilized in the same optical fiber cable 10, 10', 10". For example, the optical fiber cable 10, 10', 10" may consist of one or more layers of foams. In one embodiment, the optical fiber cable 10, 10', 10" includes a relatively softer inner layer (i.e., lower modulus), such as foam E1a, which directly contacts the stranded core or central tube and a relatively stiffer outer layer, such as foam E1b, which may contact with cable sheath or armor layer. Such a foam structure allows for further improvement of the cable mechanical performance by absorbing the strain/stress transferred to the core. Specifically, a softer inner layer reduces the compression stress imposed on a stack of optical fiber ribbons during bending and cable coiling. A stiffer outer layer together with the softer inner layer can deform under crushing and impact loading and therefore functions as spacer to reduce the loads.

The embodiments of the optical fiber cables 10, 10', 10" disclosed herein are envisioned to pass relevant telecommunications standards for reliability. For example, the malleability and flexibility of the foam allows movement of the ribbon stack subunit during cable coiling at 15× the cable outer diameter (i.e., minimum bend radius) over the temperature range of −30° C. to 70° C. and allows stress dispersion during impact, crush, and other mechanical tests. Further, by replacing free space in the optical fiber cables 10, 10', 10" with foam, the attenuation issue experienced by some conventional cables during the cable crush testing at the corner fibers of the ribbon stack is addressed and attenuation remains below 0.15 dB at all the corner fibers during the 110 N/cm compression load of Telcordia GR-20. Embodiments of the foam disclosed herein have a low modulus of less than 1 MPa for cables of having 432 optical fibers and below, and a lower modulus of 0.8 MPa for larger optical fiber counts, when measured at 50% strain. Additionally, cable designs incorporating the foam layer have improved mid-span coiling over traditional designs because the foam layer allows for much more robust cable twist performance without attenuation increase. Indeed, according to industry standard GR-20 for twist requirements, a two-meter piece of cable must be able to be twisted 180 degree in both directions without having any attenuation greater than 0.15 dB. Embodiments of the disclosed foam allow superior performance in twist testing with two full twists (720°) in both directions with attenuation less than 0.15 dB.

Additionally, the foam stays flexible at low temperature. The foam has a brittleness temperature of below −50° C. Further, the foam is dimensionally stable over the temperature range of −40° C. to 80° C., and has a shrinkback less than 5%, as required per GR-20 industry standard for jacket components.

The closed cell morphology and the selection of a POE or TPE deliver a balance of foam properties, combining low modulus to provide stress dispersion (and, consequently, fiber strain reduction) with over 90% thickness recovery after being compressed to 50% of its original thickness. The foam delivers instantaneous high recovery from large deformations of 50% strain and low compression set after 10 hours at 50% strain. When the foam is compressed for 10 hours at 50% strain, it recovers to 35% strain at 30 minutes and to 30% after 1 hour.

The foam has low tensile strength due to its high density reduction, low modulus, and the elongation of the cells in the longitudinal direction during the draw down extrusion process over the core. Additionally, this low tensile strength results in low tear strength which provides easy access into the cable core during mid-span access or end access. Also advantageously, cable components, such as the cable jacket and buffer tube, can be made thinner. For example, cable jacket thickness can be decreased from 2.5 mm to about 1.5 mm for a stranded design (e.g., as shown in FIG. 1). Further, buffer tubes having 288 optical fibers conventionally have a wall thickness of about 1.45 mm, and buffer tubes having 864 optical fibers have a wall thickness of about 1.80 mm. The thicknesses of the buffer tube according to the present disclosure is decreased to 0.25 mm to 0.30 mm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. For example, rather than foam extruding a polymer blend into or around core elements of a cable, a foam tape or substrate could first be extruded and then wrapped around the core either longitudinally or helically, or the foam may be sprayed onto the core or core elements (like a can of foam or a polymeric layer laden with chemical foaming agent could be extruded onto the core later activated thermally. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   an optical fiber;
   a cable jacket defining an interior cavity; and
   a foam layer disposed between the optical fiber and the cable jacket, wherein the foam layer comprises one of:
      a first composition comprising from 30% by weight to 80% by weight of a polyolefin elastomer (POE) and from 20% by weight to 70% by weight of low-density polyethylene (LDPE); or
      a second composition comprising from 30% by weight to 100% by weight of a thermoplastic elastomer (TPE) and from 0% by weight to 70% by weight of LDPE;
   wherein attenuation of all optical fibers in the optical fiber cable remains below 0.15 dB while the optical fiber cable is under a 110 N/cm compression load.

2. The optical fiber cable of claim 1, wherein the foam layer has a modulus of less than 1 MPa when measured at 50% strain in compression.

3. The optical fiber cable of claim 1, wherein the foam layer comprises the first composition.

4. The optical fiber cable of claim 3, wherein the foam layer has a closed cell morphology.

5. The optical fiber cable of claim 4, wherein the closed cell morphology is characterized by an average pore equivalent circle diameter of 10 μm to 500 μm.

6. The optical fiber cable of claim 1, wherein the foam layer comprises the second composition.

7. The optical fiber cable of claim 6, wherein the foam layer has a closed cell morphology.

8. The optical fiber cable of claim 7, wherein the closed cell morphology is characterized by an average pore equivalent circle diameter of 10 μm to 500 μm.

9. The optical fiber cable of claim 1, wherein the foam has a brittleness temperature below −50° C.

10. The optical fiber cable of claim 1, wherein the foam layer is dimensionally stable over a temperature range of −40° C. to 80° C.

11. The optical fiber cable of claim 1, wherein the foam layer is characterized by a greater than 90% thickness recovery after being compressed to 50% of its original thickness.

12. The optical fiber cable of claim 1, wherein when the foam is compressed for 10 hours at 50% strain, the foam layer recovers to 35% strain by 30 minutes after compressive load is removed.

13. The optical fiber cable of claim 1, wherein the foam layer is formed by a physical foaming process.

14. The optical fiber cable of claim 1, wherein the first composition or the second composition of which the foam layer is formed comprises glycerol monostearate (GMS).

15. An optical fiber cable, composing:
   an optical fiber;
   a cable jacket defining an interior cavity; and
   a foam layer disposed between the optical fiber and the cable jacket, wherein the foam layer comprises one of:
      a first composition comprising a polyolefin elastomer (POE) and low-density polyethylene (LDPE); or
      a second composition comprising a thermoplastic elastomer (TPE) and optionally LDPE;
   wherein attenuation of all optical fibers in the optical fiber cable remains below 0.15 dB while the optical fiber cable is under a 110 N/cm compression load, wherein further the first composition or the second composition of which the foam layer is formed comprises a physical nucleating agent present in an amount of 0.1 to 1.0 wt % of the first composition or the second composition.

16. The optical fiber cable of claim 15, wherein the physical nucleating agent comprises at least one of talc, calcium carbonate, or polytetrafluoroethylene (PTFE).

17. An optical fiber cable, comprising:
   an optical fiber;
   a cable jacket defining an interior cavity; and
   a foam layer disposed between the optical fiber and the cable jacket, wherein the foam layer comprises one of:
      a first composition comprising a polyolefin elastomer (POE) and low-density polyethylene (LDPE); or
      a second composition comprising a thermoplastic elastomer (TPE) and optionally LDPE;
   wherein attenuation of all optical fibers in the optical fiber cable remains below 0.15 dB while the optical fiber cable is under a 110 N/cm compression load, wherein further the first composition or the second composition of which the foam layer is formed includes a chemical foaming agent.

18. An optical fiber cable, comprising:
   an optical fiber ribbon stack, the ribbon stack comprising a plurality of optical fiber ribbons, wherein each of the optical fiber ribbons comprises a respective plurality of optical fibers disposed in a planar arrangement;
   a cable jacket defining an interior cavity; and
   a foam layer disposed between the cable jacket and the ribbon stack, wherein the foam layer comprises one of:
      a first composition comprising from 30% by weight to 80% by weight of a polyolefin elastomer (POE) and from 20% by weight to 70% by weight of low-density polyethylene (LDPE); or
      a second composition comprising from 30% by weight to 100% by weight of a thermoplastic elastomer (TPE) and from 0% by weight to 70% by sight of LDPE;
   wherein attenuation of all optical fibers in the optical fiber cable remains below 0.15 dB while the optical fiber cable is under a 110 N/cm compression load.

19. The optical fiber cable of claim 18, wherein the foam layer has a modulus of less than 1 MPa when measured at 50% strain in compression.

20. The optical fiber cable of claim 19, wherein a number of optical fibers in the optical fiber cable is greater than 432, and wherein the modulus of the foam layer is less than 0.8 MPa when measured at 50% strain in compression.

* * * * *